United States Patent

Ohmiya

[19]

[11] Patent Number: 5,815,744
[45] Date of Patent: Sep. 29, 1998

[54] DRIVING MECHANISM FOR A PHOTOGRAPHIC LENS

[75] Inventor: Akio Ohmiya, Ohmiya, Japan

[73] Assignee: Fuji Photo Optical Co., Ltd., Japan

[21] Appl. No.: 784,027

[22] Filed: Jan. 15, 1997

[30] Foreign Application Priority Data

Jan. 16, 1996 [JP] Japan .................................. 8-023173

[51] Int. Cl.⁶ .................................................. G03B 17/00
[52] U.S. Cl. ............................................. 396/72; 396/85
[58] Field of Search ................................. 396/72, 76, 77, 396/78, 79, 80, 81, 82, 83, 84, 85, 86, 87, 88

[56] References Cited

U.S. PATENT DOCUMENTS

| | | | |
|---|---|---|---|
| 5,495,309 | 2/1996 | Shiina et al. | 396/86 |
| 5,535,057 | 7/1996 | Nomura et al. | 396/72 |
| 5,598,241 | 1/1997 | Nomura et al. | 396/79 |
| 5,640,616 | 6/1997 | Ishiguro et al. | 396/86 |
| 5,659,810 | 8/1997 | Nomura et al. | 396/72 |

FOREIGN PATENT DOCUMENTS

| | | |
|---|---|---|
| 5-80244 | 4/1993 | Japan . |
| 7-128567 | 5/1995 | Japan . |

Primary Examiner—Eddie C. Lee
Attorney, Agent, or Firm—Price, Heneveld, Cooper, DeWitt & Litton

[57] ABSTRACT

A driving mechanism is described for a variable-focus photographic lens adapted to move back and forth. The driving mechanism includes a first driving lens barrel movably received within a stationary lens barrel without rotating the first driving lens barrel around an optical axis with a driving force transmitted from an electric motor. The driving mechanism of the present invention provides a so-called three-state extension lens barrel which advantageously eliminates the necessity for incorporation of driving ring members into the stationary lens barrel and/or the first driving lens barrel, as well as the necessity for constructing the stationary lens barrel and/or the first driving lens barrel in multiple structure. Such an arrangement positively contributes to the realization of a thin and compact camera. A portion of the first driving lens barrel is formed with a support block which is, in turn, formed with a guide hole into which a guide rod extending in parallel to the optical axis is loosely inserted. A portion of the support block is formed with a nut holder into which a nut member formed therearound with a female screw is loosely inserted and then a driving screw extending in parallel to the optical axis is inserted into a through-hole of the nut holder so that the driving screw may be threaded with the female screw of the nut member. Rotation of a first driving gear fixed on the driving screw causes the driving screw to be rotated and rotation of this driving screw causes the nut member to move along the driving screw. Consequently, the first driving lens barrel moves in the same direction.

7 Claims, 6 Drawing Sheets

DRIVING MECHANISM FOR A PHOTOGRAPHIC LENS

BACKGROUND OF THE INVENTION

The present invention relates to a driving mechanism for a photographic lens adapted to move the photographic lens back and forth in parallel to an optical axis of the photographic lens for power variation or focusing.

As photographic cameras become more popular, marketing trends require that cameras should be more and more compact, thin, and lightweight and simultaneously contain a power varying mechanism such as a zoom mechanism or focus change-over mechanism. The power varying mechanism functions to move the photographic lens back and forth in a direction parallel to an optical axis, for example, to move the photographic lens outward with respect to a camera body for telephoto, and move the photographic lens back toward the camera body for wide-angle or standard photo. Thus, a lens barrel holding the photographic lens is moved back and forth relative to the camera body in parallel to the optical axis.

In order to assure that the photographic lens can be moved within a given range to obtain a desired magnification while making the camera as thin as possible, the lens barrel is typically constructed with four stages of which three stages can be successively moved. More specifically, the lens barrel should be constructed so that a first driving lens barrel is movable back and forth relative to a stationary lens barrel, a second driving lens barrel is movable back and forth relative to the first driving lens barrel, and a movable lens barrel holding a part of the photographic lens is movable back and forth relative to the second driving lens barrel. By adopting such an arrangement, it is possible to limit a length of the lens barrel in the direction of the optical axis approximate to a length of the stationary lens barrel and to obtain a moving range of the photographic lens approximately corresponding to three times the length of the stationary lens barrel. By adopting such arrangement, it is possible to limit a length of the lens barrel in the direction of the optical axis relative to a length of the stationary lens barrel and to obtain a moving range of the photographic lens approximately corresponding to three times the length of the stationary lens barrel. The respective stages of the lens barrel must keep the photographic optical system in a predetermined optical relationship during their movement.

A driving mechanism to move the lens barrel back and forth utilizing a cam barrel is also well-known and the above-mentioned arrangement can be adopted in such a driving mechanism. By utilizing a single cam, a single power source may be used and cost savings may be realized. However, a length of the cam will be unacceptably increased to assume an adequate moving range of the lens barrel while making the camera body as thin as possible. Consequently, a cam slit must be formed in the lens barrel over its full length, resulting in an apprehension that the strength of the lens barrel might be unacceptably decreased. Particularly, in the case of the photographic lens adopting a power varying/focusing mechanism which relies upon a single cam, the cam will be inevitably made longer and the cam strength will correspondingly decrease. To avoid such an inconvenience, a cam groove having a bottom, instead of a cam in the form of a through-hole, has been adopted as the cam formed in the lens barrel.

It is also well-known from Japanese Patent Application Disclosure Gazette No. 1995-128567 to move one driving lens barrel back and forth in parallel to the optical axis without rotation and to rotate the other lens barrel about the optical axis to thereby move it back and forth in parallel to the optical axis so that a front lens group frame may be moved back and forth in parallel to the optical axis as the other lens barrel rotates.

However, the driving mechanism formed with the previously-described cam groove having the bottom suffers from the following problem. With the conventional mechanism utilizing the cam slit formed in the lens barrel to drive the photographic lens, a pin member interlocked with the cam slit is operatively associated with the cam slits of two lens barrel stages, one serving to guide a movement in parallel to the optical axis and the other serving to regulate a distance of this movement. With the driving mechanism adopting the cam in the form of a groove having a bottom, on the other hand, it is impossible for the pin member to extend through the lens barrel and therefore, in addition to the lens barrel state formed with the cam groove, a driving ring member or the like must be provided to control a direction as well as a distance of the pin member's movement. In the case of a triple stage zoom lens barrel described in Japanese Patent Application Disclosure Gazette No. 1995-128567, a stationary lens barrel comprises inner and outer barrels between which a rotatable barrel is disposed. Such double barrel arrangement correspondingly enlarges the outer diameter of the lens barrel and limits the possibility of making the camera compact.

SUMMARY OF THE INVENTION

Accordingly, it is a principal object of the invention to provide a driving mechanism for a photographic lens allowing the camera to be made more compact without incorporating additional components such as a rotatable barrel or a driving ring and adopting a lens barrel of a dual structure.

To achieve this and other aspects and advantages, the driving mechanism of the present invention comprises a first driving lens barrel received by a stationary lens barrel so as to be driven back and forth by a linear driving means in the direction of the optical axis without rotating around the optical axis; a second driving lens barrel received by the first driving lens barrel so as to be movable back and forth in the direction of the optical axis relative to the first driving lens barrel as the second driving lens barrel rotates around the optical axis; and a movable lens barrel received by the second driving lens barrel so as to be movable back and forth by a predetermined distance in the direction of the optical axis as the second driving lens barrel is rotated about the optical axis.

The second driving lens barrel is preferably moved in synchronism back and forth with the first driving lens barrel as it is moved back and forth in the direction of the optical axis. In addition, the second driving lens barrel is moved back and forth by a distance longer than the distance by which the first driving lens barrel is moved back and forth as the second driving lens barrel is rotated relative to the first driving lens barrel. Rotation of the second driving lens barrel causes the movable lens barrel received within the second driving lens barrel to be moved back and forth by a distance longer than the distance by which the second driving lens barrel is moved back and forth. The photographic lens is moved back and forth by a distance corresponding to a sum of the respective distances by which the first driving lens barrel, the second driving lens barrel, and the movable lens barrel are moved back and forth. The photographic lens is operatively associated with a selected one of these lens barrels so that the photographic lens may be moved back and forth relative to this selected lens barrel in a predetermined optical relationship with the selected lens barrel to make the photographic lens operate in a power varying mode or in a focusing mode.

The driving mechanism may further include a first linear driving member provided inside the first driving lens barrel so as to move back and forth in the direction of the optical axis as the first driving lens barrel moves back and forth, as well as a second linear driving member operatively associated with the second driving lens barrel and the first linear driving member so as to move back and forth in the direction of the optical axis without rotating around the optical axis as the second driving lens barrel moves back and forth. In this manner, the movable lens barrel that is operatively associated with the second linear driving member is thereby prevented from rotating about the optical axis.

The second linear driving member is operatively associated with the first linear driving member so that the first linear driving member is moved back and forth together with the first driving lens barrel to maintain the operative association between the first and second linear driving members. Thus, even when a movement of the movable lens barrel is relatively large, the movement of the movable lens barrel is reliably guided due to the operative association of the movable lens barrel with the second linear driving member.

In a zoom lens system comprising, for example, a front lens group and a rear lens group, it is desired to maintain a predetermined optical relationship between these front and rear lens groups as they are moved back and forth in the direction of the optical axis. To achieve this goal, the present invention provides a driving mechanism wherein a rear lens group is operatively associated with the second driving lens barrel so as to be moved back and forth by a predetermined distance in the direction of the optical axis while a front lens group is operatively associated with the movable lens barrel so as to be moved back and forth together with the movable lens barrel. A predetermined optical relationship between these front and rear lens groups is readily maintained during the back and forth movement of these lens groups in the direction of the optical axis due to the operative association of the front lens group with the movable lens barrel and the operative association of the rear lens group with the second driving lens barrel whereby the front lens group is moved together with the movable lens barrel and the rear group is moved back and forth by an appropriate distance in the direction of the optical axis as the second driving lens barrel is moved back and forth.

The driving mechanism of the present invention may further include a guide member operatively associated with the second driving lens barrel so as to move back and forth together with the second driving lens barrel in the direction of the optical axis along guide means formed on the first driving lens barrel.

While the previously-described construction to prevent the movable lens barrel from rotating around the optical axis comprises a combination of the first linear driving member and the second linear driving member, which, in turn, is operatively associated with the movable lens barrel, this simplified construction replaces the first linear driving member by the guide means which functions to prevent the guide member from rotating around the optical axis. This construction is characterized in that the guide means comprises guide grooves formed on the inner peripheral surface of the first driving lens barrel and parallel to the optical axis, and guide ribs formed on the guide member so that the guide ribs may be loosely inserted into the guide grooves, and thereby, the guide member may be guided so as to move back and forth in the direction of the optical axis.

According to a specific construction of the linear driving means, the linear driving means comprises a female screw formed on a portion of the stationary lens barrel and a driving screw formed with a male screw thread therearound adapted to be threaded with the female screw and extending in parallel to the optical axis so that the driving screw may be rotated by the driving force transmitted from an electric motor. Preferably, the female screw can be detachably detached to the stationary lens barrel.

According to a specific construction allowing the second lens barrel to be rotated relative to the first driving lens barrel, the first driving lens barrel supports at the rear end of its inner peripheral surface, a rear end of a coupling shaft so as to be moved back and forth together with the first driving lens barrel; a first gear is fixed to the coupling shaft adjacent its rear end so as to rotate and move back and forth integrally with the coupling shaft, the second driving lens barrel slidably supports at its rear portion the coupling shaft along a length defined between its front and middle portions; the second driving lens barrel is formed with an internal gear; the coupling shaft slidably supports a second gear adapted to be engaged with the internal gear so as to rotate integrally with the coupling shaft; and the second driving lens barrel is rotated relative to the first driving lens barrel as the first gear rotates.

Rotation of the first gear causes the coupling shaft to be rotated together with the first gear, and thereby, causes the second gear to be rotated. Rotation of the second gear causes the internal gear to be rotated, and thereby, causes the second driving lens barrel to be rotated relative to the first driving lens barrel. While the second driving lens barrel moves back and forth relative to the first driving lens barrel as it rotates around the optical axis, the coupling shaft is slidably moved back and forth together with the first driving lens barrel relative to the second driving lens barrel because the coupling shaft is slidably supported by the rear portion of the second driving lens barrel.

The features and advantages of the invention as well as additional aspects, may be realized and obtained by means of the instrumentalities and combinations particularly pointed out in the written description and claims hereof as well as the appended drawings.

DETAILED DESCRIPTION OF THE PREFERRED EMBODIMENTS

Specific details of the driving mechanism for the photographic lens according to the invention will be more fully understood from the following description of the preferred embodiments made in reference with the accompanying drawings.

Figure 2:
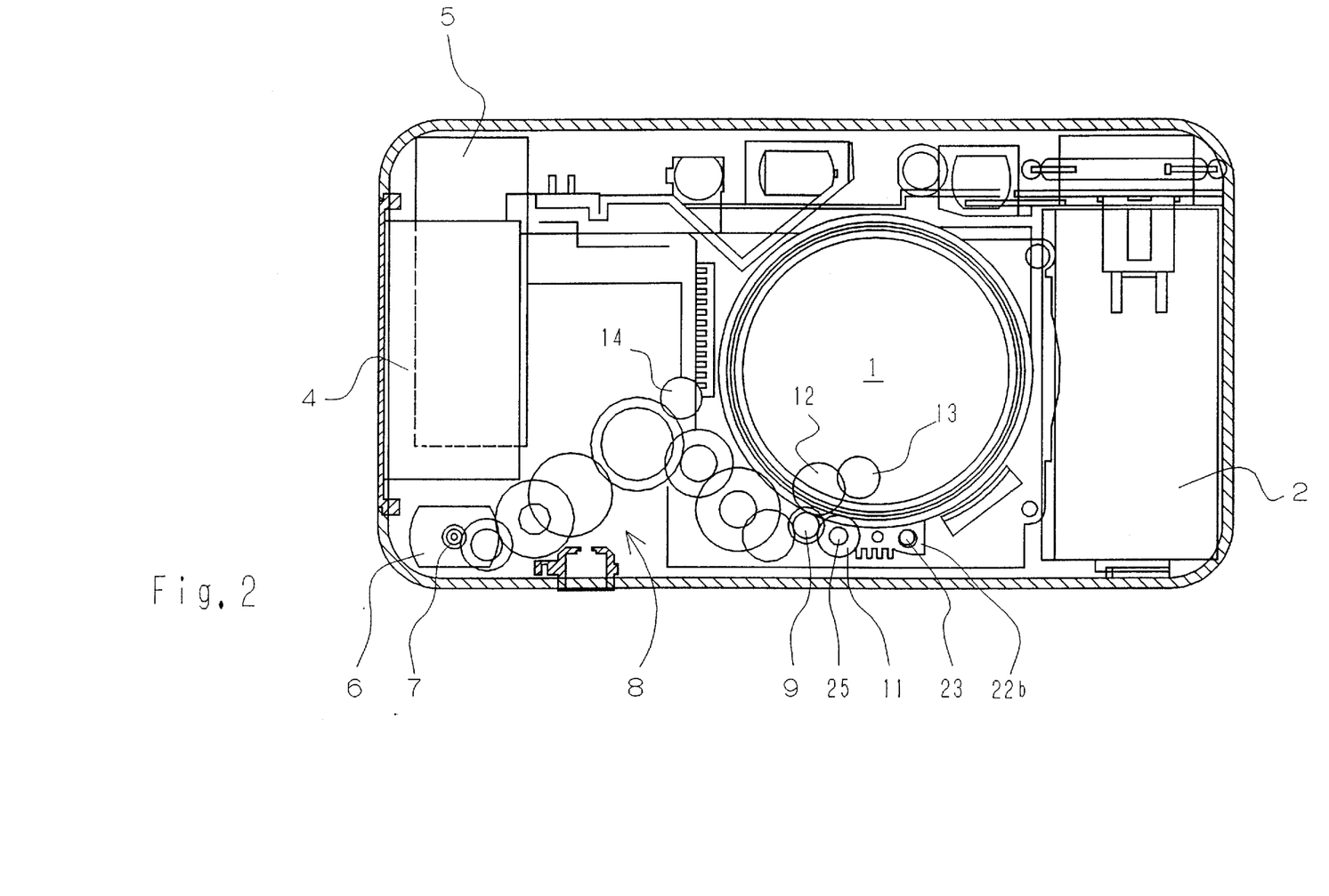
FIG. 2 is a sectional view taken along a horizontal plane extending adjacent a top side of the inventive variable-focus photographic camera.
Figure 3:
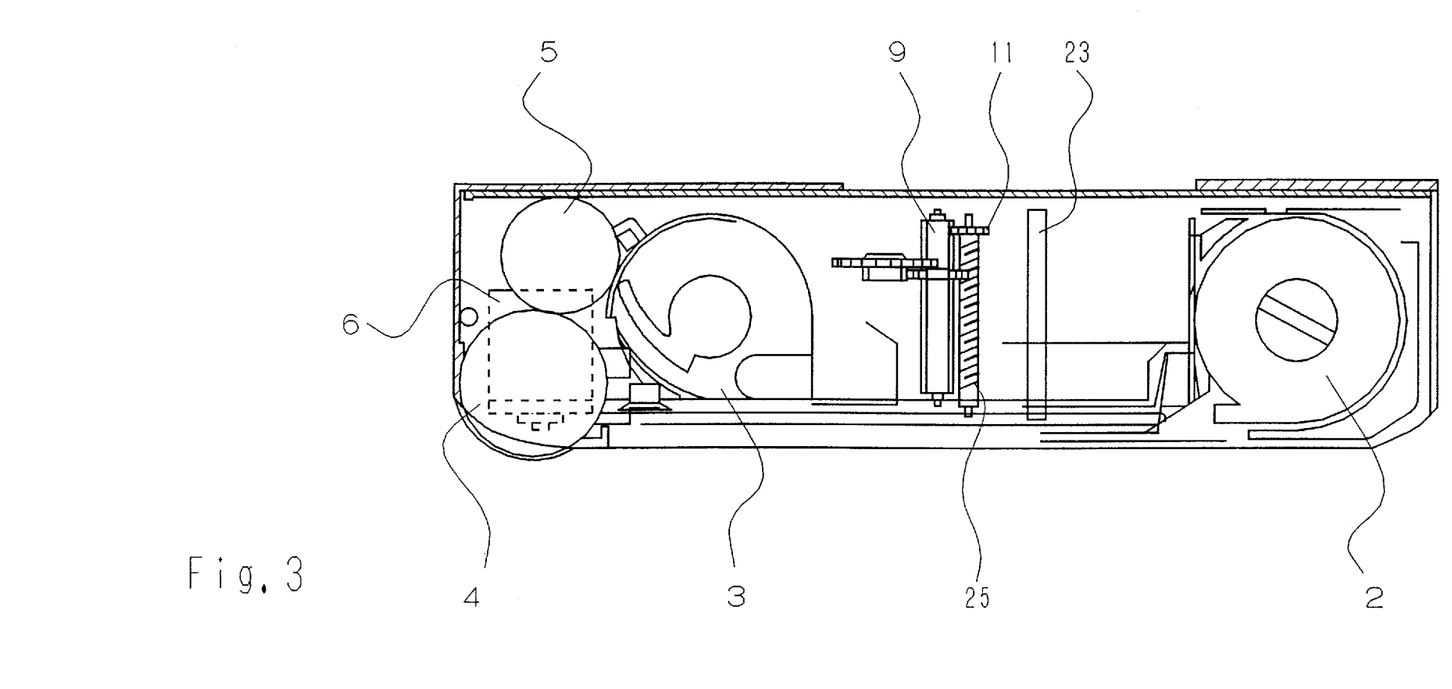
FIG. 3 is a sectional view taken along a vertical plane including an optical axis of the photographic lens, showing the inventive variable-focus photographic camera as the photographic lens has moved to its foremost position.

FIG. 2 is a sectional view taken along a vertical plane extending adjacent a rear side of the photographic camera with the inventive driving mechanism for the photographic lens, and FIG. 3 is a sectional view taken along a horizontal plane extending adjacent a top side of this camera. On both sides of a camera body, there are provided a patrone chamber 2 and a spool chamber 3, respectively, with a photographic lens 1 therebetween. The camera body further includes, in a region defined between spool chamber 3 and the adjacent lateral end of the camera body, a dry battery 4 serving as a power source and a main capacitor 5 for powering a strobe circuit. Below dry battery 4, there is provided an electric motor 6 used to drive elements such as the lens barrels. More specifically, this electric motor 6 is located at the greatest possible distance within the camera body from photographic lens 1. While this specific embodiment is described here as having dry battery 4, main capacitor 5, and electric motor 6 located outside spool chamber 3, these elements may be located outside patrone chamber 2 rather than spool chamber 3 on the other side of the camera body where electric motor 6 would be adequately spaced from photographic lens 1.

In this embodiment, electric motor 6 has its output shaft extending in parallel to the optical axis of photographic lens 1 and a lens barrel driving gear 9 is operatively associated via a gear train 8 functioning as a power transmitting element with a pinion 7 fixed on the output shaft of motor 6. It should be understood that respective shafts carrying pinion 7 and gear train 8 also extend in parallel to the optical axis of photographic lens 1. Each tooth of lens barrel driving gear 9 has a thickness substantially defined by a full length of its shaft and extends in parallel to the optical axis as shown by FIG. 3. Lens barrel driving gear 9 is engaged with a first driving gear 11, and a driving force transmission gear 12. As will be seen in FIGS. 2 and 4, driving force transmission gear 12 is, in turn, engaged with a second driving gear 13 which is mounted on the rear end of the first driving lens barrel as described below, so as to be rotatable around an axis extending in parallel to the optical axis S. It should be understood that, as shown by FIG. 2, a transmission gear 14 is engaged with an intermediate gear included in the gear train 8 and an appropriate gear train (not shown) is operatively associated with the transmission gear 14 to provide a driving force for a power varying mechanism of a viewfinder included within the camera.

Figure 1:
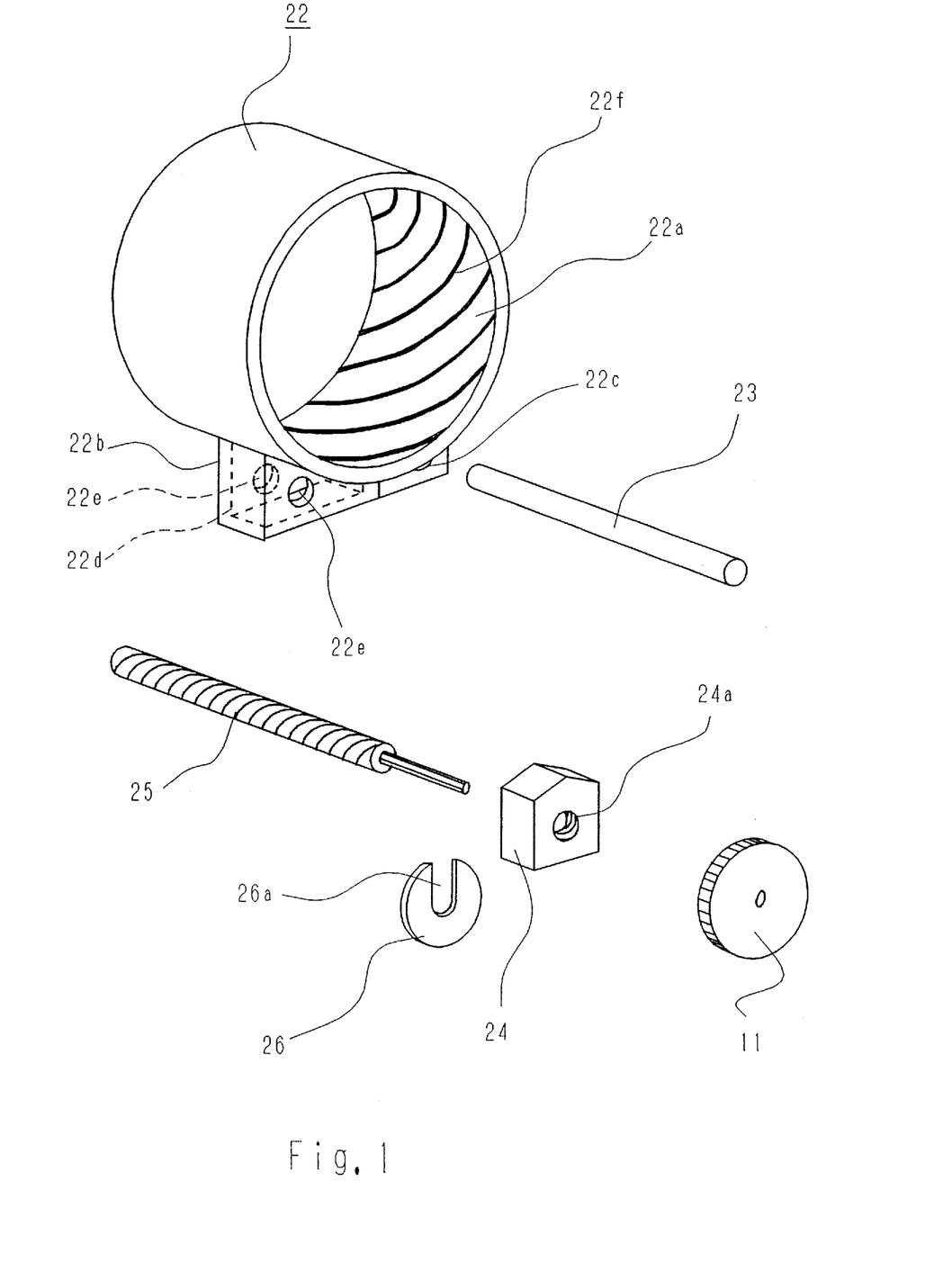
FIG. 1 is an exploded perspective view schematically showing a mechanism that constitutes a part of the photographic lens driving mechanism for the inventive variable-focus photographic camera and that is used to guide a first driving lens barrel of the photographic lens driving mechanism linearly back and forth.
Figure 4:
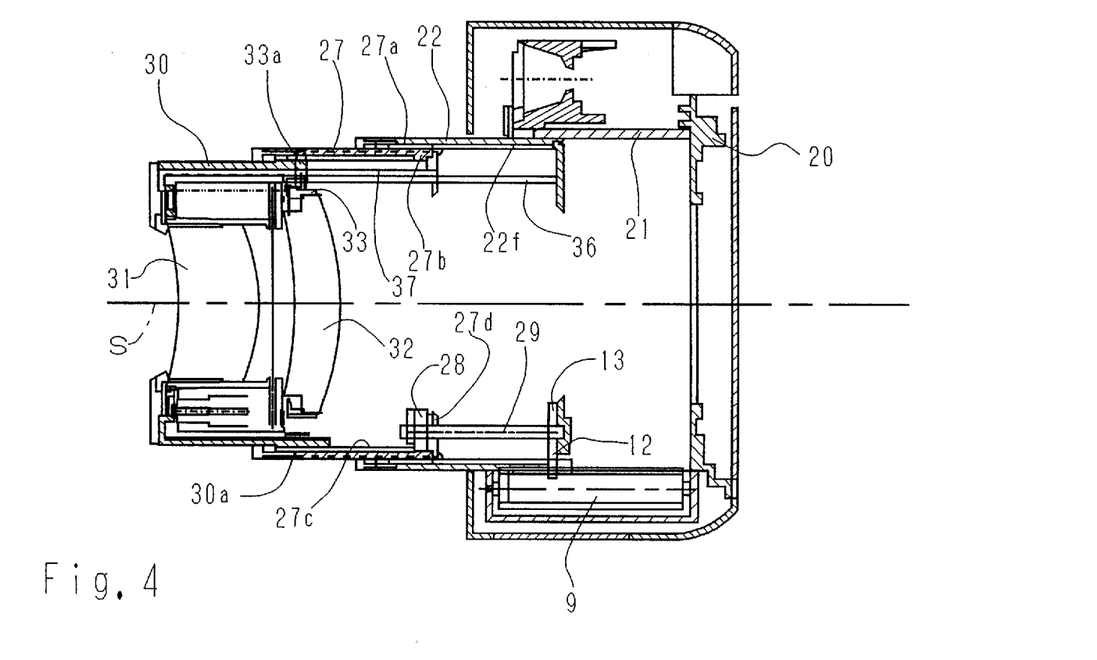
FIG. 4 is a sectional view taken along a vertical plane including the optical axis of the photographic lens, showing the inventive variable-focus photographic camera as the photographic lens has moved to its rearmost position.
Figure 5:
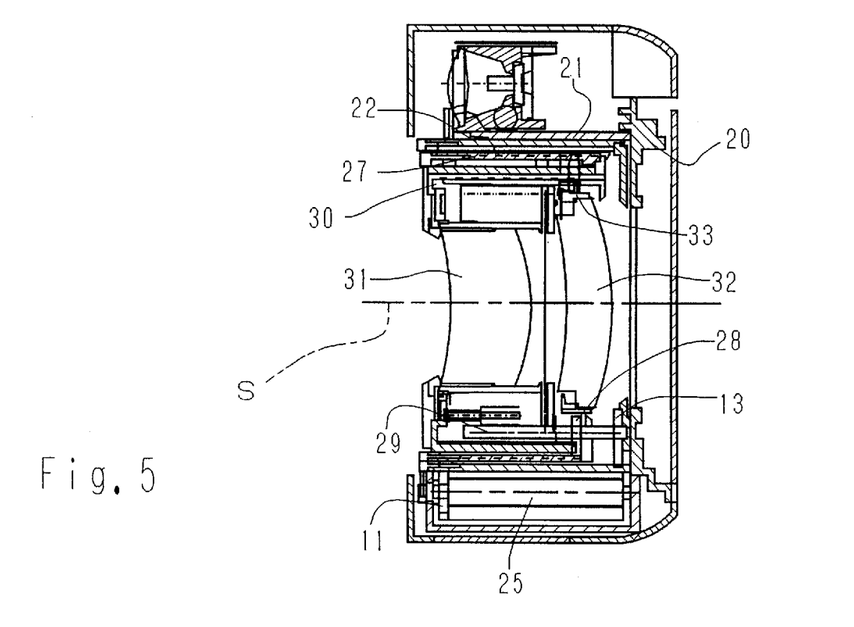
FIG. 5 is a sectional view taken along a vertical plane extending adjacent a rear side of the inventive variable-focus photographic camera.

Referring to FIGS. 4 and 5, the camera body 20 is provided with a stationary lens barrel 21 which, in turn, receives therein a first driving lens barrel 22 so as to be slidable along the optical axis S. As shown in FIG. 1, first driving lens barrel 22 comprises a main body 22a, a support block 22b formed on the outside of main body 22a, a guide hole 22c formed at one end of support block 22b and a guide rod 23 slidably inserted into and supported by guide hole 22c in the direction of the optical axis S, as shown by FIGS. 1 through 3. A hollow nut holder 22d opening downward is formed at the other end of support block 22b and a pair of through-holes 22e are formed in mutually opposed surfaces of nut holder 22d extending orthogonally to the optical axis S. A nut member 24 is detachably inserted through the holder 22d so that a female screw 24a formed in nut member 24 may be aligned with through-holes 22e as nut member 24 is properly inserted into nut holder 22d.

A driving screw 25 is engaged with the female screw 24a of nut member 24 held by nut holder 22d. Driving screw 25 is oriented in parallel to the optical axis S, as shown in FIG. 3, and provided at one end thereof with first driving gear 11 fixed thereto so as to be rotated as first driving gear 11 is rotated. As will be apparent from FIG. 1, driving screw 25 is threaded into nut member 24 with interposition of a washer 26. Washer 26 is formed with a substantially U-shaped notch 26a so that washer 26 may be attached or detached even after driving screw 25 has been threaded into nut member 24.

Referring again to FIG. 1, first driving lens barrel 22 has a female helicoid 22f formed on its inner peripheral surface and receives therein a second driving lens barrel 27 having a male helicoid 27a formed on its outer peripheral surface and adapted to be threaded within female helicoid 22f. Referring now to FIG. 4, second driving lens barrel 27 is formed on its inner peripheral surface adjacent a rear end thereof with an internal gear 27b with which a follower gear 28, serving as a second gear, is engaged. Follower gear 28 is operatively associated with a coupling shaft 29 extending in parallel to the optical axis S in such a manner that follower gear 28 is rotated by splines or the like of coupling shaft 29 as the coupling shaft is rotated to slide follower gear 28 relative to said coupling shaft 29. Second driving gear 13 is fixed on a rear end of this coupling shaft 29 which is rotated as second driving gear 13 is rotated. Coupling shaft 29 has a portion to its rear end rotatably supported on a rear part of first driving lens barrel 22 and the remaining portion extending from its middle to its forward end rotatably as well as slidably supported on a rear part of second driving lens barrel 27.

Second driving lens barrel 27 has a female helicoid 27c formed on its inner peripheral surface and receives therein a movable lens barrel 30 which has a male helicoid 30a formed on its outer peripheral surface and adapted to be threaded with female helicoid 27c. Movable lens barrel 30 holds therein a front lens group 31 adapted to be moved synchronously with movable lens barrel 30.

A first key 36 functioning as a first linear driving member is fixed to the rear end of first driving lens barrel 22 so as to be moved back and forth together with first driving lens barrel 22 along the optical axis S. Similarly, a second key 37 functioning as a second linear driving member is operatively associated with the rear end of second driving lens barrel 27. Second driving lens barrel 27 is formed at its rear end with a flange 27d extending inward, and the rear end of second key 37 is operatively associated with the rear end of second driving lens barrel 27 in such a manner that the rear end of second key 37 loosely holds flange 27d. In this manner, second key 37 is moved back and forth along the optical axis S as second driving lens barrel 27 is moved back and forth and second driving lens barrel 27 is rotatable relative to second key 37.

Figure 6:
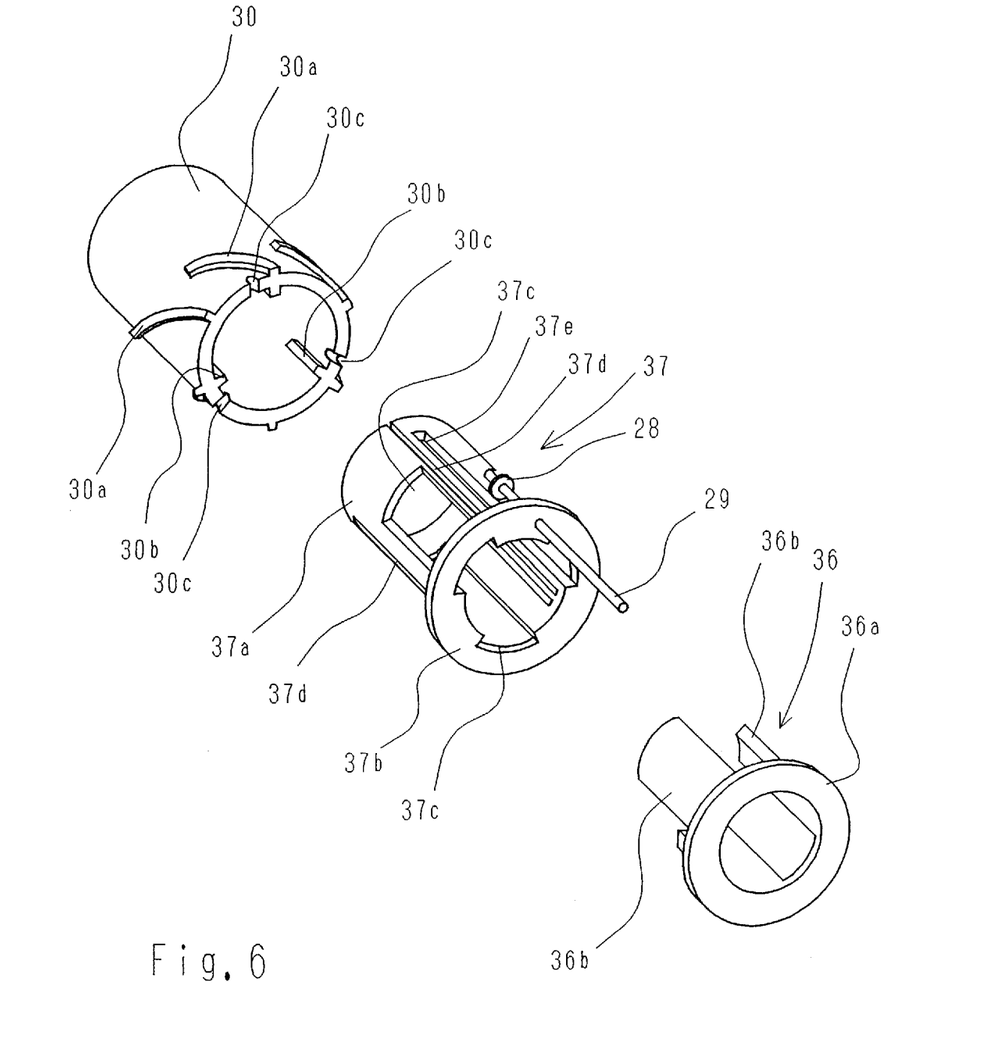
FIG. 6 is an exploded perspective view showing components of the photographic lens driving mechanism according to the invention.

Referring to FIG. 6, first key 36 comprises a centrally opening flange 36a destined to be locked by first driving lens barrel 22 and three key elements 36b extending forward from this flange 36a. Second key 37 comprises a cylindrical main body 37a, a flange 37b formed at the rear end of main body 37a and destined to be engaged with flange 27d of second driving lens barrel 27, and key receiving openings 37c extending from the inner side surface of flange 37b into main body 37a. The respective key elements 36b are loosely inserted into key receiving openings 37c. Thus, second key 37 is slidable along the optical axis S relative to first key 36 even after key elements 36b of first key 36 have been loosely inserted from the side of flange 37b into the respective key receiving openings 37c.

Movable lens barrel 30 is loosely positioned around main body 37a of second key 37. Referring to FIG. 6, main body 37a is formed with an appropriate number of guide slots 37d longitudinally extending in parallel to the optical axis S and the inner peripheral surface of movable lens barrel 30 is formed at its rear end with the corresponding number of guide ribs 30b adapted to be loosely inserted into the respective guide slots 37d. As a consequence, once guide ribs 30b of movable lens barrel 30 have been loosely inserted into the respective guide slots 37d of second key 37 and first key 36, second key 37 and movable lens barrel 30 are assembled together but movable back and forth relative to one another along the optical axis S and movable lens barrel 30 is prevented from rotating around the optical axis S.

Referring to FIG. 5, a rear lens group 32 is held by a rear lens group frame 33 which is, in turn, provided on its outer peripheral surface with interlocking pins 33a radially projecting therefrom. Second key 37 is formed, as shown in FIG. 6, with guide slots 37e extending in parallel to the optical axis S, into which interlocking pins 33a are loosely inserted. Interlocking pins 33a have their forward ends loosely inserted into cam grooves (not shown) formed on the inner peripheral surface of second driving lens barrel 27. In this manner, a distance by which rear lens group 32 moves as second driving lens barrel 27 rotates is controlled by the interlocking pins 33a being guided along the cam grooves. Consequently, second driving lens barrel 27 is guided by guide slots 37e so as to move along the optical axis S and thereby rear lens group 32 moves by a predetermined distance along the optical axis S. The distance by which rear lens group 32 moves is different from the distance by which movable lens barrel 30 moves. Accordingly, front lens group 31 and rear lens group 32 move along the optical axis S with a predetermined optical relationship maintained between these two lens groups 31 and 32. Referring to FIG. 6, the rear end of movable lens barrel 30 has notches 30c formed at locations aligned with guide slots 37e and adapted to receive the forward ends of interlocking pins 33a.

The embodiments of the inventive driving mechanism for a photographic lens as described above operate in the manner described below.

FIG. 4 shows the camera with front lens group 31 and rear lens group 32 moved to their foremost positions. FIG. 5 shows the camera with these two lens groups moved to their rearmost positions. Referring to FIG. 5, when electric motor 6 is energized and a driving force is transmitted by gear train 8 to lens barrel driving gear 9, rotation of lens barrel driving gear 9 causes first driving gear 11 engaged with lens barrel driving gear 9 to rotate and, in consequence, driving screw 25 also rotates in the same direction as first driving gear 11, since first driving gear 11 is integrally fixed to driving screw 25. Rotation of driving screw 25 causes nut member 24 to move forth and first driving lens barrel 22 also moves forth in synchronism, since nut member 24 is threaded with driving screw 25 and nut member 24 is received by nut holder 22d of first driving lens barrel 22 which is, in turn, guided by guide rod 23. In addition, first key 36 fixed to the rear end of first driving lens barrel 22 also moves forth as first driving lens barrel 22 moves forth.

Driving force transmission gear 12 is also in engagement with lens barrel driving gear 9, and therefore, energization of electric motor 6 causes driving force transmission gear 12 to rotate. As a result, second driving gear 13 which is in engagement with driving force transmission gear 12 simultaneously rotates. Both driving force transmission gear 12 and second driving gear 13 are provided on the rear end of first driving lens barrel 22, so they move forth together with first driving lens barrel 22. During this movement, driving force transmission gear 12 and lens barrel driving gear 9 are reliably maintained in engagement with each other since each tooth of lens barrel driving gear 9 has a thickness substantially defined by a full length of its shaft and extending in parallel to the optical axis S. Coupling shaft 29 rotates synchronously with second driving gear 13 since second driving gear 13 is integrally fixed to coupling shaft 29, and follower gear 28 operatively associated with coupling shaft 29 also synchronously rotates. Follower gear 28 is in engagement with internal gear 27b formed on the inner peripheral surface of second driving lens barrel 27 which is rotatably received by first driving lens barrel 22. Accordingly, second driving lens barrel 27 rotates around the optical axis S as follower gear 28 rotates. Second driving lens barrel 27 is operatively associated by means of helicoids 27a and 22f, respectively, with first driving lens barrel 22 and second driving lens barrel 27 rotatably relative to first driving lens barrel 22. Consequently, second driving lens barrel 27 moves forth relative to first driving lens barrel 22. Second key 37 operatively associated with the rear end of second driving lens barrel 27 is operatively associated also with first key 36, so second key 37 moves forth without rotation relative to first key 36 synchronously with second driving lens barrel 27. This means that the second driving lens barrel 27 and second key 37 move forth further than first driving lens barrel 22 and first key 36, respectively. Follower gear 28 slidably moves forth along coupling shaft 29 together with second driving lens barrel 27.

Movable lens barrel 30 is operatively associated by means of helicoids 30 and 27c, respectively, with second driving lens barrel 27 while movable lens barrel 30 is operatively associated by means of guide ribs 30b and guide slots 37d, respectively, with second key 37 adapted to move forth in the direction of the optical axis S. Accordingly, rotation of second driving lens barrel 27 causes movable lens barrel 30 to move forth relative to second driving lens barrel 27. Front lens group 31 also moves forth together with movable lens barrel 30 since front lens group 31 is held by movable lens barrel 30. Being operatively associated with second key 37 and second driving lens barrel 27, rear lens group 32 is guided along guide slots 37e so as to move forth by a distance controllably given by rotation of second driving lens barrel 27 until front lens group 31 and rear lens group 32 reach their foremost positions, as shown in FIG. 4. Front lens group 31 and rear lens group 32 move forth with a predetermined optical relationship being maintained therebetween, and the power varies as movable lens barrel 30 moves forth.

When, from the position shown in FIG. 4, the output shaft of electric motor 6 rotates in the reverse direction, the direction in which lens barrel driving gear 9 rotates is also reversed with respect to the direction in which this gear 9 rotated in the previous operation as described above.

Consequently, first driving lens barrel 22 moves back relative to stationary lens barrel 21, second driving lens barrel 27 moves back relative to first driving lens barrel 22, and movable lens barrel 30 moves back relative to second driving lens barrel 27 until front lens group 31 and rear lens group 32 reach their rearmost positions as shown in FIG. 5.

While this specific embodiment has been described and illustrated as the linear driving means used to move first driving lens barrel 22 relative to stationary lens barrel 21 comprising a combination of the rotatable driving screw 25 and nut member 24 threaded with driving screw 25, it is possible to employ another mechanism as this linear driving means. For example, the linear driving means may comprise a rack formed on a portion of first driving lens barrel 22 and a gear adapted to be engaged with the rack so that the gear may be rotated by electric motor 6. Specifically, so long as first driving lens barrel 22 can be received by stationary lens barrel 21 and rotatably support second driving lens barrel 27, first driving lens barrel 22 can be provided with a desired component or partially cut-off to obtain a desired configuration, because first driving lens barrel 22 is linearly driven in the direction of the optical axis S without rotation around the optical axis S.

Figure 7:
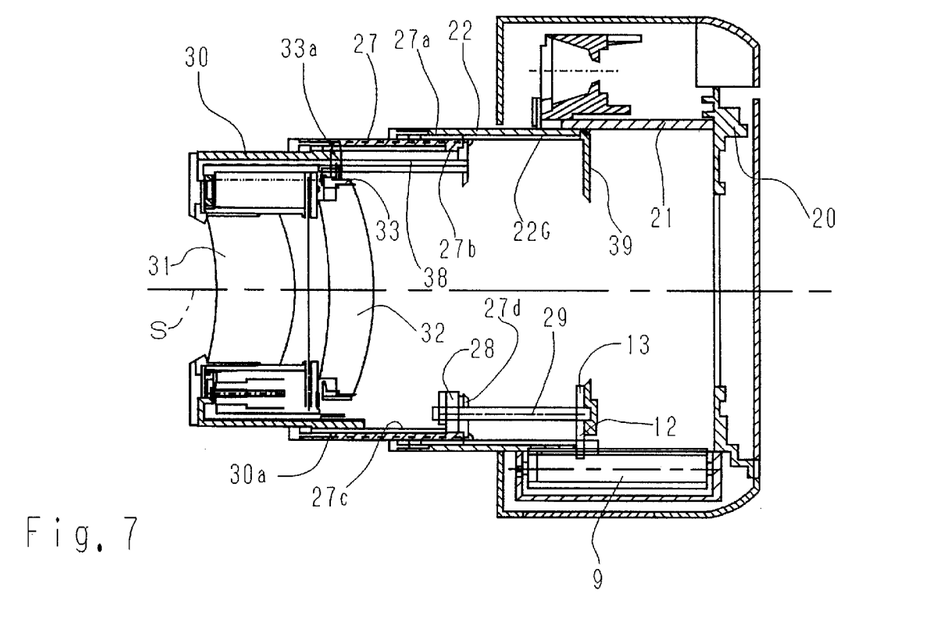
FIG. 7 is a sectional view corresponding to FIG. 3, showing an alternative embodiment of the guide mechanism for the movable lens barrels.
Figure 8:
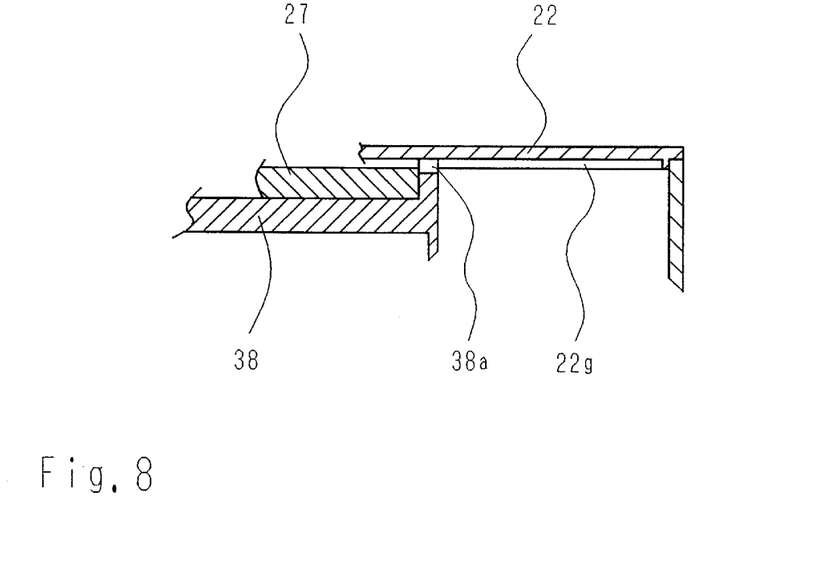
FIG. 8 is a sectional view showing, in an enlarged scale, the components shown in FIG. 7 as partially cut-out.

Referring now to FIGS. 7 and 8, an alternative embodiment of the mechanism adapted to guide the back and forth movement of movable lens barrel 30 is described. It should be understood that the parts similar to those in the embodiment shown by FIGS. 1 through 6 will be designated by the similar reference numerals, respectively, and not repetitiously described hereinafter. FIG. 8 is a sectional view showing a part of first driving lens barrel 22 in an enlarged scale. As shown, first driving lens barrel 22 is formed on its inner peripheral surface with, in addition to female helicoid 22f, an appropriate number of guide grooves 22g serving to guide a guide key 38 in parallel to the optical axis. Guide key 38 is operatively associated with movable lens barrel 30 in a manner similar to second key 37 according to the previously-described embodiment and formed at its rear end with guide ribs 38a destined to be loosely inserted into guide grooves 22g. Once having been loosely inserted into the respective guide grooves 22g, guide ribs 38a prevent guide key 38 from rotating around its own axis and simultaneously guide this guide key 38 so as to move back and forth in the direction of the optical axis. It should be understood that guide slots 37c formed in second key 37 according to the previously-described embodiment are unnecessary for this guide key 38. The rear end of guide key 38 is operatively associated with second driving lens barrel 27 so that guide key 38 may move back and forth together with second driving lens barrel 27 in the direction of the optical axis. An annular masking plate 39 is mounted on the rear end of first driving lens barrel 22 in order to avoid a phenomenon of flare due to light coming from an object to be photographed through the photographic lens.

According to the construction shown by FIGS. 7 and 8, the second driving lens barrel 27 is operatively associated with first driving lens barrel 22 by means of their helicoids 27a and 22f, and moves back and forth in the direction of the optical axis as second driving lens barrel 27 is rotated by the driving force transmitted from electric motor 6, and guide key 38 also moves back and forth as second driving lens barrel 27 moves back and forth in the same direction as the direction in which second driving lens barrel 27 moves. At this point in time, guide ribs 38a of guide key 38 are in loose engagement with guide grooves 22g formed on the inner peripheral surface first driving lens barrel 22, and therefore, guide key 38 linearly moves back and forth without rotation. More specifically, first key 36 provided in the embodiment previously-described and illustrated by FIGS. 1 through 6 is unnecessary for the embodiment illustrated by FIGS. 7 and 8 and the back and forth movement of guide key 38 equivalent to second key 37 in the previously described embodiment is guided by guide grooves 22g formed on the inner peripheral surface of first driving lens barrel 22. In this way, the number of parts can be decreased and the construction can be correspondingly simplified.

As will be apparent from the foregoing description, the driving mechanism for the photographic lens adopted in the photographic camera provided with the variable focus lens system according to the invention advantageously makes it unnecessary to employ additional members such as a driving ring and to form the stationary lens barrel in a multiple structure because of the unique arrangement such that the first driving lens barrel is moved back and forth relative to the stationary lens barrel without rotating the first driving lens barrel. As a consequence, the outer diameter of the lens barrel assembly can be significantly reduced and thereby the camera can be miniaturized with its thickness or depth being maintained as small as possible.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

an elongated driving gear having gear teeth extending along a length thereof for delivering a rotational driving force;

a first driving lens barrel received by a stationary lens barrel;

linear driving means operably coupled to said elongated driving gear for translating the rotational driving force into a linear driving force to drive said first driving lens barrel back and forth in the direction of the optical axis without rotating said first driving lens barrel around the optical axis;

a second driving lens barrel received by said first driving lens barrel so as to be movable back and forth in the direction of the optical axis relative to said first driving lens barrel as said second driving lens barrel rotates around the optical axis;

rotational driving means operably coupled to said first driving lens barrel and to said elongated driving gear to be rotated thereby to rotate said second driving lens barrel; and a movable lens barrel received by said second driving lens barrel so as to be movable back and forth by a predetermined distance in the direction of the optical axis as said second driving lens barrel is rotated around the optical axis, wherein:

a rear lens group is operatively associated with said second driving lens barrel so as to be moved back and forth by a predetermined distance in the direction of the optical axis while a front lens group is operatively associated with said movable lens barrel so as to be moved back and forth together with said movable lens barrel;

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

2. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

an elongated driving gear having gear teeth extending along a length thereof for delivering a rotational driving force;

a first driving lens barrel received by a stationary lens barrel;

linear driving means operably coupled to said elongated driving gear for translating the rotational driving force into a linear driving force to drive said first driving lens barrel back and forth in the direction of the optical axis without rotating said first driving lens barrel around the optical axis;

a second driving lens barrel received by said first driving lens barrel so as to be movable back and forth in the direction of the optical axis relative to said first driving lens barrel as said second driving lens barrel rotates around the optical axis;

rotational driving means operably coupled to said first driving lens barrel and to said elongated driving gear to be rotated thereby to rotate said second driving lens barrel; and a movable lens barrel received by said second driving lens barrel so as to be movable back and forth by a predetermined distance in the direction of the optical axis as said second driving lens barrel is rotated around the optical axis, wherein:

said linear driving means comprises a female screw formed on a portion of said stationary lens barrel and a driving screw formed with a male screw thread therearound adapted to be threaded with said female screw and extending in parallel to the optical axis so that said driving screw may be rotated by a driving force transmitted from an electric motor;

said female screw is detachably attached to said stationary lens barrel;

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

3. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

an elongated driving gear having gear teeth extending along a length thereof for delivering a rotational driving force;

a first driving lens barrel received by a stationary lens barrel;

linear driving means operably coupled to said elongated driving gear for translating the rotational driving force into a linear driving force to drive said first driving lens barrel back and forth in the direction of the optical axis without rotating said first driving lens barrel around the optical axis;

a first linear driving member provided inside said first driving lens barrel so as to move back and forth in the direction of the optical axis as said first driving lens barrel moves back and forth;

a second driving lens barrel received by said first driving lens barrel and operatively associated with said first driving lens barrel by means of helicoids so as to move back and forth in the direction of the optical axis as said second driving lens barrel rotates around the optical axis;

a second linear driving member operatively associated with said second driving lens barrel and said first linear driving member so as to move back and forth in the direction of the optical axis without rotating around the optical axis as said second driving lens barrel moves back and forth; and a movable lens barrel operatively associated with said second linear driving member so as to be prevented thereby from rotating around the optical axis and operatively associated with said second driving lens barrel by means of helicoids and to move back and forth by a predetermined distance in the direction of the optical axis as said second driving lens barrel is rotated around the optical axis, wherein:

said linear driving means comprises a female screw formed on a portion of said stationary lens barrel and a driving screw formed with a male screw thread therearound adapted to be threaded with said female screw and extending in parallel to the optical axis so that said driving screw may be rotated by a driving force transmitted from an electric motor;

said female screw is detachably attached to said stationary lens barrel;

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

4. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

a first driving lens barrel received by a stationary lens barrel so as to be driven back and forth by linear driving means in the direction of the optical axis without rotating around the optical axis;

a first linear driving member provided inside said first driving lens barrel so as to move back and forth in the direction of the optical axis as said first driving lens barrel moves back and forth;

a second driving lens barrel received by said first driving lens barrel and operatively associated with said first driving lens barrel by means of helicoids so as to move back and forth in the direction of the optical axis as said second driving lens barrel rotates around the optical axis;

a second linear driving member operatively associated with said second driving lens barrel and said first linear driving member so as to move back and forth in the direction of the optical axis without rotating around the optical axis as said second driving lens barrel moves back and forth; and a movable lens barrel operatively associated with said second linear driving member so as to be prevented thereby from rotating around the optical axis and operatively associated with said second driving lens barrel by means of helicoids and to move back and forth by a predetermined distance in the direction of the optical axis as said second driving lens barrel is rotated around the optical axis, wherein:

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

5. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

an elongated driving gear having gear teeth extending along a length thereof for delivering a rotational driving force;

a first driving lens barrel received by a stationary lens barrel;

linear driving means operably coupled to said elongated driving gear for translating the rotational driving force into a linear driving force to drive said first driving lens barrel back and forth in the direction of the optical axis without rotating said first driving lens barrel around the optical axis;

a first linear driving member provided inside said first driving lens barrel so as to move back and forth in the direction of the optical axis as said first driving lens barrel moves back and forth;

a second driving lens barrel received by said first driving lens barrel and operatively associated with said first driving lens barrel by means of helicoids so as to move back and forth in the direction of the optical axis as said second driving lens barrel rotates around the optical axis;

a second linear driving member operatively associated with said second driving lens barrel and said first linear driving member so as to move back and forth in the direction of the optical axis without rotating around the optical axis as said second driving lens barrel moves back and forth; and a movable lens barrel operatively associated with said second linear driving member so as to be prevented thereby from rotating around the optical axis and operatively associated with said second driving lens barrel by means of helicoids and to move back and forth by a predetermined distance in the direction of the optical axis as said second driving lens barrel is rotated around the optical axis wherein:

a rear lens group is operatively associated with said second driving lens barrel so as to be moved back and forth by a predetermined distance in the direction of the optical axis while a front lens group is operatively associated with said movable lens barrel so as to be moved back and forth together with said movable lens barrel;

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

6. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

a first driving lens barrel received by a stationary lens barrel so as to be driven back and forth by linear driving means in the direction of the optical axis without rotating around the optical axis;

a second driving lens barrel received by said first driving lens barrel and operatively associated with said first driving lens barrel by means of helicoids so as to move back and forth in the direction of the optical axis as said second driving lens barrel rotates around the optical axis;

a guide member operatively associated with said second driving lens barrel so as to move back and forth together with said second driving lens barrel in the direction of the optical axis along guide means formed on said first driving lens barrel; and a movable lens barrel operatively associated with said guide member so as to be prevented thereby from rotating around the optical axis and operatively associated with said second driving lens barrel by means of helicoids so as to move back and forth by a predetermined distance in the direction of the optical axis as said second driving lens barrel rotates around the optical axis, wherein:

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

7. A driving mechanism for a photographic lens serving to drive a lens barrel assembly with which the photographic lens is operatively associated back and forth in the direction of an optical axis so that said photographic lens may operate either in a power varying mode or in a focusing mode, said driving mechanism comprising:

a first driving lens barrel received by a stationary lens barrel so as to be driven back and forth by linear driving means in the direction of the optical axis without rotating around the optical axis;

a second driving lens barrel received by said first driving lens barrel so as to be movable back and forth in the direction of the optical axis relative to said first driving lens barrel as said second driving lens barrel rotates around the optical axis; and a movable lens barrel received by said second driving lens barrel so as to be movable back and forth by a predetermined distance in the direction of the optical axis as said second driving lens barrel is rotated around the optical axis, wherein:

said first driving lens barrel supports at a rear end of an inner peripheral surface of said first driving lens barrel, a rear end of a coupling shaft that is moved back and forth together with said first driving lens barrel;

a first gear is fixed to said coupling shaft adjacent the rear end of said coupling shaft so as to rotate and move back and forth integrally with said coupling shaft;

said second driving lens barrel slidably supports at a rear portion thereof, said coupling shaft along a length defined between front and middle portions of said coupling shaft;

said second driving lens barrel is formed with an internal gear;

said coupling shaft slidably supports a second gear adapted to be engaged with said internal gear so as to rotate integrally with said coupling shaft; and said second driving lens barrel is rotated relative to said first driving lens barrel as said first gear rotates.

* * * * *